United States Patent [19]

Walker et al.

[11] Patent Number: 5,197,852
[45] Date of Patent: Mar. 30, 1993

[54] NOZZLE BAND OVERHANG COOLING

[75] Inventors: Alan Walker, Wyoming; Dean T. Lenahan, Cincinnati; Gary M. Itzel, Mason, all of Ohio; Andrew P. Elovic, Rishon Lezion, Israel

[73] Assignee: General Electric Company, Cincinnati, Ohio

[21] Appl. No.: 531,413

[22] Filed: May 31, 1990

[51] Int. Cl.[5] .......................... F01D 9/02; F01D 25/08
[52] U.S. Cl. ..................................... 415/115; 415/176; 415/177; 415/200
[58] Field of Search ............... 415/115, 116, 117, 200, 415/175, 176, 177

[56] References Cited

U.S. PATENT DOCUMENTS

| | | | |
|---|---|---|---|
| 1,755,321 | 4/1930 | Hendrickson | 415/217.1 |
| 2,737,366 | 4/1951 | Ledinegg | 415/115 |
| 3,388,888 | 6/1968 | Kercher | 415/115 |
| 3,628,880 | 12/1971 | Smuland . | |
| 3,649,225 | 3/1972 | Simmons, Jr. | 428/667 |
| 3,800,864 | 4/1974 | Hauser et al. | 415/115 |
| 3,867,065 | 2/1975 | Schaller | 415/200 |
| 3,992,126 | 11/1976 | Brown et al. . | |
| 4,012,167 | 3/1977 | Noble | 415/115 |
| 4,017,213 | 4/1977 | Przirembel | 415/115 |
| 4,040,767 | 8/1977 | Dierberger et al. | 415/115 |
| 4,127,358 | 11/1978 | Parkes | 416/97 R |
| 4,157,232 | 6/1979 | Bobo et al. . | |
| 4,177,004 | 12/1979 | Riedmiller et al. . | |
| 4,187,054 | 2/1980 | Landis, Jr. et al. . | |
| 4,277,222 | 7/1981 | Barbeau | 415/177 |
| 4,286,924 | 9/1981 | Gale | 416/97 R |
| 4,288,201 | 9/1981 | Wilson . | |
| 4,300,868 | 11/1981 | Wilkinson et al. . | |
| 4,353,679 | 10/1982 | Hauser | 415/115 |
| 4,525,997 | 7/1985 | Baran, Jr. . | |
| 4,551,064 | 11/1985 | Pask | 415/115 |
| 4,565,490 | 1/1986 | Rice | 415/115 |
| 4,605,452 | 8/1986 | Gemma et al. | 148/404 |
| 4,616,976 | 10/1986 | Lings et al. | 416/97 R |
| 4,627,233 | 12/1986 | Baran, Jr. . | |
| 4,693,667 | 9/1987 | Lenz | 415/115 |
| 4,712,979 | 12/1987 | Finger | 416/96 R |
| 4,798,514 | 1/1989 | Pask . | |
| 4,798,515 | 1/1989 | Hsia et al. . | |
| 4,804,311 | 2/1989 | Anderson et al. | 415/191 |
| 4,821,522 | 4/1989 | Matthews et al. . | |
| 4,825,643 | 5/1989 | Hennecke et al. . | |
| 4,861,228 | 8/1989 | Todman . | |
| 4,880,614 | 11/1989 | Strangman et al. | 428/623 |
| 4,885,216 | 12/1989 | Naik | 148/404 |
| 4,916,022 | 4/1990 | Solfest | 428/632 |

FOREIGN PATENT DOCUMENTS

| | | |
|---|---|---|
| 3307749 | 3/1983 | Fed. Rep. of Germany . |
| 1438229 | 6/1976 | United Kingdom . |
| 1322802 | 7/1979 | United Kingdom . |
| 1553701 | 10/1979 | United Kingdom . |
| 2054749 | 7/1980 | United Kingdom . |
| 2042643 | 9/1980 | United Kingdom . |
| 2130244 | 3/1983 | United Kingdom . |
| 2107405 | 4/1983 | United Kingdom . |
| 2112868 | 7/1983 | United Kingdom . |
| 1605219 | 8/1984 | United Kingdom . |
| 2210415 | 6/1989 | United Kingdom . |
| 80/00988 | 5/1980 | World Int. Prop. O. . |

OTHER PUBLICATIONS

Fundamental of Heat and Mass Transfer 2nd ed. pp. 342,343, Incropera.
Thin Solid Films, 127 (1985) May, No. ½ Lausanne, Switzerland- "Thermal Barrier Coatings for Turbine Airfoils", by Thomas E. Strangman.
NTIS Tech Notes (1989) Apr. Springfield, US- "Preferred Secondary Crystaal Orientation for Turbine Blades", p. 282.

Primary Examiner—Edward K. Look
Assistant Examiner—Michael S. Lee
Attorney, Agent, or Firm—Jerome C. Squillaro; David L. Narciso

[57] ABSTRACT

The present invention is a unique nozzle assembly for a high pressure turbine of a gas turbine engine. The nozzle assembly includes a series of circumferentially spaced vanes and a nozzle band. The nozzle band supports the vanes and includes a mounting flange extending radially from the nozzle band and adapted to be secured to the gas turbine engine. The nozzle band has an overhang portion axially downstream of the mounting flange. A pin fin bank is formed within the overhang portion for allowing cooling fluid to flow therethrough to cool the overhang portion.

19 Claims, 2 Drawing Sheets

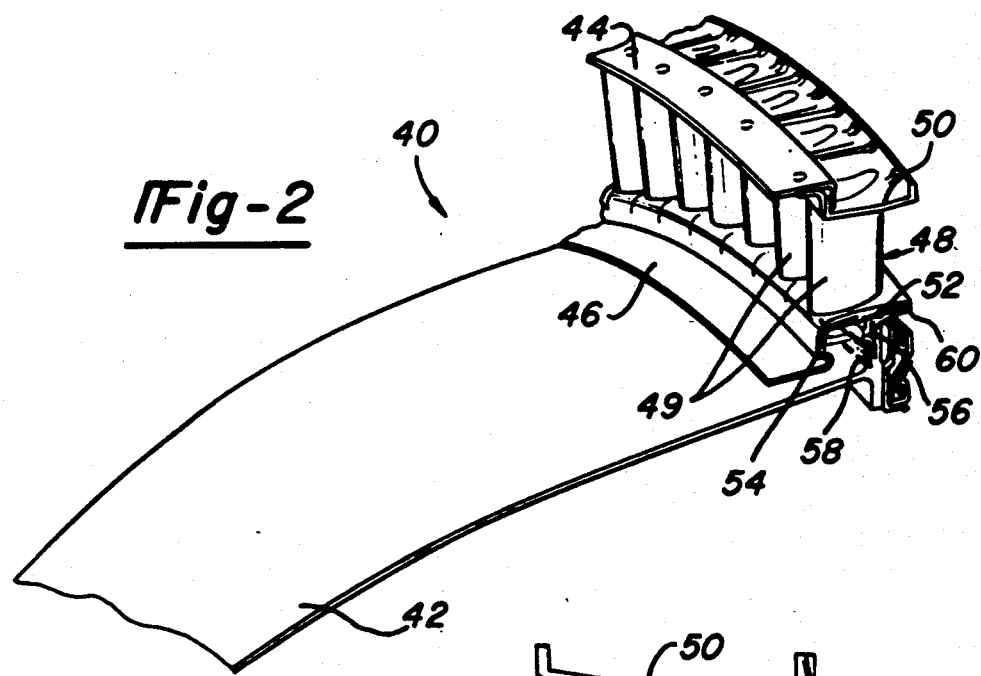
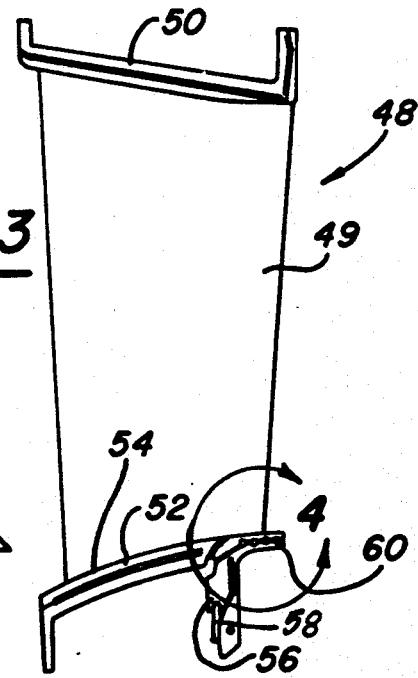
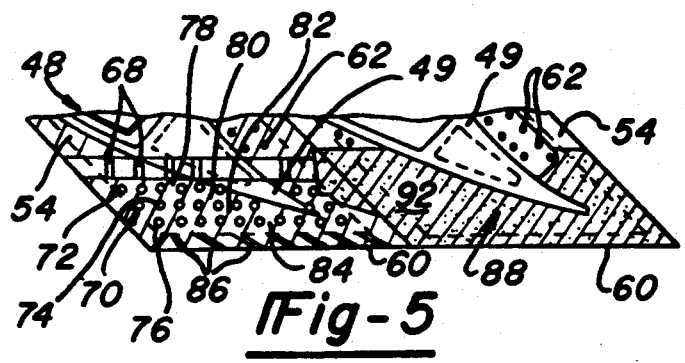
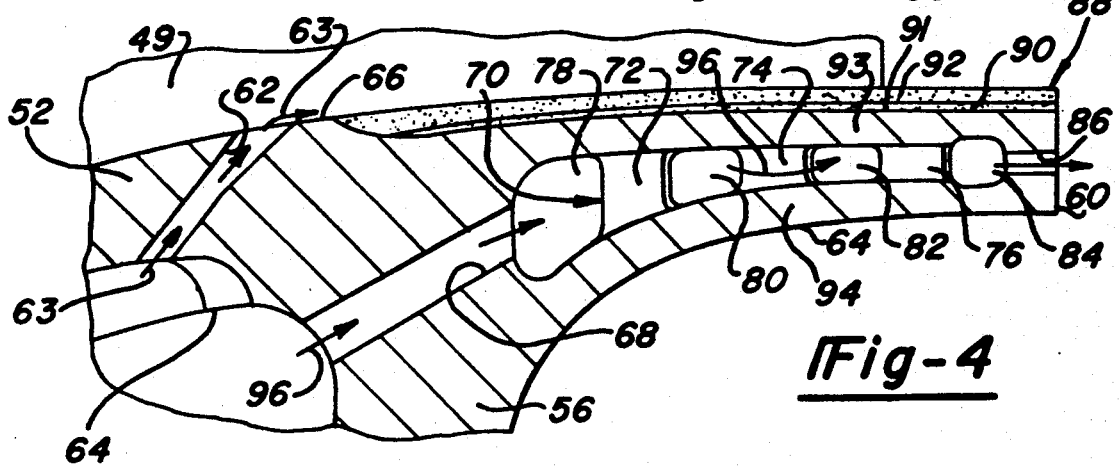

NOZZLE BAND OVERHANG COOLING

The Government has rights in the invention pursuant to Contract No. F33657-83-C-2005 awarded by the Department of the Air Force.

BACKGROUND OF THE INVENTION

1. Field of the Invention

The present invention relates generally to gas turbine engines, and more particularly, to a nozzle assembly for a high pressure turbine of a gas turbine engine.

2. Description of Related Art

Gas turbine engines typically include an outer casing or nacelle which forms an inlet sized to provide a predetermined airflow to a core engine. The core engine generally includes a compressor for pressurizing inlet air which is discharged to a combustor where fuel is burned to provide high energy combustion gases which drive a core engine turbine or high pressure turbine. The high pressure turbine, in turn, drives the compressor.

The high pressure turbine commonly includes one or more rows or stages of a plurality of turbine blades which are circumferentially spaced apart about a turbine rotor. The high pressure turbine also includes a nozzle assembly for directing high pressure gases from the combustor onto the turbine blades at the proper angle and velocity to rotate or drive the turbine blades and rotors.

Generally, the nozzle assembly includes a plurality of nozzle vanes which extend radially between and are circumferentially spaced apart about an annular inner and outer nozzle band. The inner nozzle band provides a platform for the nozzle vane and includes a mounting flange extending radially inwardly for mounting the inner nozzle band to a nozzle support to react against the pressure loads imposed on the nozzle vanes. To provide a continuous flowpath to the platform of the nozzle vane, the inner nozzle band extends axially aft of the mounting flange to form a solid continuous lip or band "overhang".

Typically, the nozzle vanes are cooled by compressor discharged air which flows through a series of leading edge holes and gill holes or apertures on each side of the nozzle vanes. Air flowing from these holes forms a thin film of cool air over the outer surface of the nozzle vane. Internally, the nozzle vane is divided into two cavities and air flowing into the aft cavity is discharged through trailing edge slots. Moreover, the nozzle bands are cooled by impinging air on the radially inward or back side in combination with film cooling on the radially outward or gas path side.

One disadvantage of the above nozzle vane cooling scheme is that it is difficult to cool the band overhang which typically causes an area of distress. As a result, axial cracks may develop in the band overhang due to the existence of a high temperature gradient between the aft end of the band overhang and the cool mounting flange, particularly during transient operation.

One proposed solution to cool the band overhang by back side air impingement involved an impingement manifold system. An example of this is disclosed in U.S Pat. No. 4,187,054, issued Feb. 5, 1990, to inventors Landis, Jr. et al., which is assigned to the same assignee as the present invention. This manifold system allows cooling air to be introduced to the back side of the band overhang and past the mounting flange. The manifold system may be integral to the gas path side. As a result, high temperature gradient may exist between the hot gas path side and the cool back side which critically limits the life of the band overhang.

Previously, other attempts have been made to cool the band overhang, but have not proved successful or have produced poor results. One attempt was to internally cool the band overhang by serpentine cooling. An example of this is disclosed in U.S. Pat. No. 4,353,659, issued Oct. 12, 1982, to inventor Hauser, which is assigned to the same present invention. Serpentine passages were cored into the nozzle band and band overhang. Air entered and flowed through the serpentine passages. Air from the serpentine passages was vented as a film upstream of a nozzle throat, the minimum passage between an adjacent pair of vanes where the gas path static pressure is the highest. However, the serpentine passages proved to be an ineffective means of conducting heat from the gas path side to the back side, resulting in high temperature gradients between the gas path side and the back side. As a result, axial cracks developed in the band overhang and cooling air leaked out through the serpentine passages rather than flowing through the complete passage. This leakage reduced both the film flow and hole backflow margin which caused the gas path side to increase in temperature, further increasing the temperature gradient.

Another attempt to cool the band overhang utilized pin-fin cooling. The back side of the band overhang was a sheet metal cover brazed onto a plurality of pins extending radially inwardly from the nozzle band. However, the sheet metal cover could not be effectively brazed onto all of the pins. As a result, heat conduction from the gas path side to the back side was localized, resulting in high temperature gradients. Additionally, the braze material tended to fill some of the pins, resulting in hot spots.

SUMMARY OF THE INVENTION

It is, therefore, a primary object of the present invention to provide cooling for the band overhang on a nozzle assembly for high pressure turbine of a gas turbine engine.

It is another object of the present invention to reduce axial cracks in the band overhang of a nozzle band for a nozzle assembly.

It is yet another object of the present invention to reduce the temperature gradient between the band overhang and mounting flange of a nozzle band.

It is a further object of the present invention to provide a simple structure for cooling the band overhang.

Briefly stated, the above objects are accomplished in the preferred embodiment of the present invention wherein a unique nozzle assembly of a high pressure turbine is included in a gas turbine engine. The nozzle assembly includes a plurality of circumferentially spaced vanes and nozzle band. The nozzle band supports the vanes and includes a mounting flange extending radially from the nozzle band and adapted to be secured to the gas turbine engine. The nozzle band has an overhang portion axially downstream of the mounting flange. A means forms a pin fin bank within the overhang portion for allowing cooling fluid to flow therethrough to cool the overhang portion.

One advantage of the present invention is that cooling of the band overhang of a nozzle assembly for a high pressure turbine is accomplished. Another advantage of the present invention is that the pin fin bank yields higher life capability of the band overhang with less cooling air flow than a solid overhang. Yet another advantage of the present invention is that the use of a thermal barrier coating reduces temperature gradients between the gas path side and the back side of the pin fin bank, particularly during transient operation. A further advantage of the present invention is that the pin fin bank provides a simpler structure that assures a direct conductivity path from the gas path side to the back side of the overhang.

Other objects, features and advantages of the present invention will be readily appreciated as the same becomes better understood by reference to the following description when considered in connection with the accompanying drawings.

BRIEF DESCRIPTION OF THE DRAWINGS

FIG. 2 is an enlarged partial perspective view of the circled portion of FIG. 1.

FIG. 3 is an elevational view of the nozzle vanes of FIG. 2 incorporating nozzle band overhang cooling according to the present invention.

FIG. 4 is an enlarged partial fragmentary view of the circled portion of FIG. 3.

FIG. 5 is a partial plan fragmentary view of the nozzle vanes of FIGS. 2 through 4 incorporating nozzle band overhang cooling according to the present invention.

DESCRIPTION OF THE PREFERRED EMBODIMENT

Figure 1:
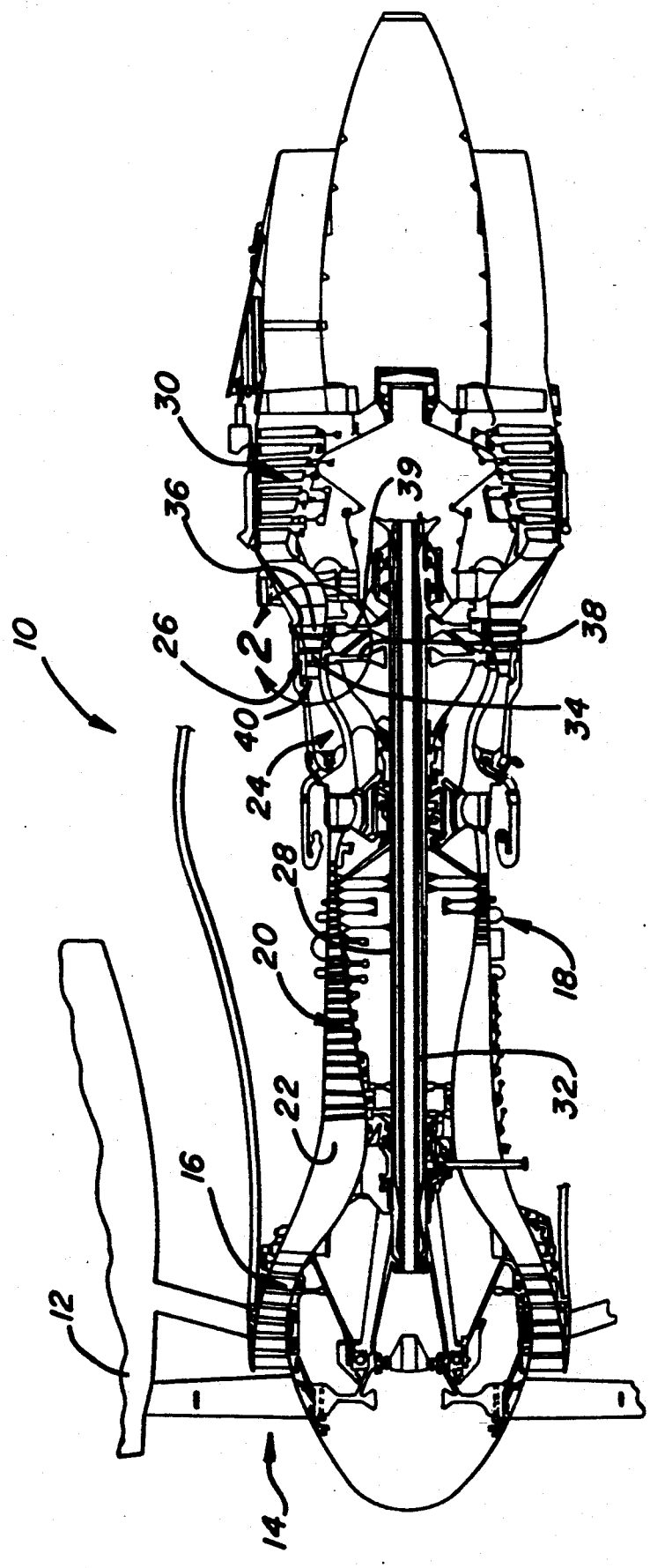
FIG. 1 is a cross-sectional view of a gas turbine engine incorporating nozzle band overhang cooling according to the present invention.

Referring to the drawings, wherein like numerals correspond to like elements throughout, attention is first directed to FIG. 1, there is shown a conventional gas turbine engine 10, such as a turbofan gas turbine engine. The gas turbine engine 10 includes an outer casing or nacelle 12, the upstream end of which forms an inlet, generally indicated at 14, sized to provide a predetermined airflow to the internal components of the engine 10. Disposed within the inlet 14 is a fan, generally indicated at 16. The fan 16 pressurizes the airflow from the inlet 14. Downstream of the fan 16 is a engine, generally shown at 18. The core engine 18 includes an axial flow compressor, generally indicated at 20. Pressurized air from the fan 16 enters the core engine 18 through compressor inlet 22 and is further compressed by the compressor 20 and discharged to a combustor, generally indicated at 24. In the combustor 24, fuel is burned to provide high energy combustion gases which drive a core engine turbine or high pressure turbine, generally indicated at 26. The high pressure turbine 26, in turn, drives the compressor 20 through a shaft 28 in the usual manner of a gas turbine engine. Hot combustion gasses can then pass to and drive a fan turbine or low pressure turbine, generally indicated at 30, which, in turn, drives the fan 16 through a shaft 32 in the usual manner of a gas turbine engine. A more detailed description of the gas turbine engine 10 is disclosed in either U.S. Pat. No. 3,879,941 —Sargisson or U.S. Pat. No. 4,080,785 —Koff et al., both of which are assigned to the same assignee as the present invention.

The high pressure turbine 26 typically includes one or more rows or stages of a plurality of turbine 34 and 36 which are circumferentially spaced apart about turbine rotors 38 and 39, respectively. The high pressure turbine 26 also includes a nozzle assembly, generally indicated at 40, such as a first stage nozzle assembly for directing high pressure gases from the combustor 26 onto the turbine blades 34 at a predetermined angle and velocity to rotate or drive the turbine blades 34 and turbine rotor 38. It should be appreciated that the turbine 38 is connected to the shaft 28 to drive a rotor of the compressor 20. It should also be appreciated that a similar nozzle assembly 40 may be used for other stages of the high pressure turbine 26.

Referring to FIG. 2, nozzle assembly 40 includes a nozzle support 42 which is an annular component. The nozzle support 42 forms an inner flowpath wall and is typically secured to a rear frame of the compressor 20 by means such as fasteners (not shown). The nozzle assembly 40 also includes an outer ring seal 44 and an inner ring seal 46. The nozzle assembly 40 further includes a plurality of circumferentially spaced and generally radial turbine nozzle vanes, generally indicated at 48. The nozzle vanes 48 include radially extending vanes 49 carried by a segmented annular outer nozzle band 50 and similarly segmented inner nozzle band 52. It should be appreciated that the outer and inner ring seals 44 and 46 prevent leakage of the hot combustion gases around the outer and inner nozzle bands 50 and 52, respectively. A more detailed description of the nozzle assembly is disclosed in U.S. Pat. No. 4,353,679 —Hauser, which is assigned to the same assignee of the present invention and the disclosed material is incorporated herein by reference.

Referring to FIGS. 2 and 3, the inner nozzle band 52 provides an annular wall or platform 54 extending laterally of the nozzle vane 49. The inner nozzle band 52 also includes a mounting flange 56 protruding radially inwardly for mounting the inner nozzle band 52 to the nozzle support 42. The mounting flange 56 is connected to the nozzle support 42 by means such as a segmented retainer strip 58. The retainer strip 58 extends radially and is partially disposed in corresponding grooves of the mounting flange 56 and nozzle support 42. The inner nozzle band 52 further includes an aft axially extending lip or band overhang 60 to provide a continuous flowpath to the platform 54. It should be appreciated that the bolt-less retention of the mounting flange 56 reduces the axial length of the band overhang 60. It should also be appreciated that the mounting flange 56 could be connected to the nozzle support 42 by means of a conventional bolted connection, but would result in an increased axial length for the band overhang 60.

Referring to FIG. 4, the inner nozzle band 52 includes a plurality of cooling holes or aperture 62 extending through the platform 54 at an acute angle. Air, represented by arrows 63, is exhausted from a back side 64 of the inner nozzle band 52 through the cooling apertures 62 to a gas path side 66 and forms a thin film of cool air over the platform 54. The inner nozzle band 52 also includes a plurality of cooling air feed holes or apertures 68 extending at an angle through the mounting flange 56 from the back side 64 to the band overhang 60.

Referring to FIGS. 4 and 5, the band overhang 60 includes a pin fin array or bank, generally indicated at 70, to enhance cooling and conduction to the back side 64. The pin fin bank 70 is cast or cored into the band overhang 60 and integral therewith. The pin fin bank 70 comprises a plurality of axially and laterally spaced pins 72, 74 and 76 aligned in laterally extending rows. The pins 72, 74 and 76 are typically round and spaced two diameters apart. The pins 72, 74 and 76 have a predetermined diameter such as 0.060 inches. The pins 72, 74 and 76 are axially spaced to form passages 78, 80, 82 and 84 extending laterally between the rows. It should be appreciated that passages extend axially between the pins 72, 74 and 76. The inlet passage 78 has a radial height approximately 0.060 inches and the outlet passage 84 has a radial height approximately 0.040 inches. A plurality of discharge holes or aperture 86 extend from the outlet passage 84 and are directed tangentially. The discharge aperture 86 are Electro-Discharge Machined (EDM) or laser drilled to reduce turbine performance losses.

The band overhang 60 also includes a thermal barrier coating, generally indicated at 88, on the gas path side 66 to reduce heat flux and transient temperature gradients. The thermal barrier coating 88 has a first or inner 90 of a high oxidation resistant rough material disposed on a recessed portion 91 of the band overhang 60. The first layer 90 is approximately 0.005 inches thick and is applied to the recessed portion 91 by conventional vacuum plasma spraying. The thermal barrier coating 88 also has a second or outer layer 92 of a ceramic material. Preferably, the ceramic material has a composition of eight percent (8%)$Y_2O_3$ and ninety-two percent (92%)$ZrO_2$. The second layer 92 is approximately 0.015 inches thick and is applied on top of or adjacent the first layer 90 by conventional air plasma spraying such that the outer surface of the second layer 92 is flush or continuous with the outer surface of the platform 54.

The band overhang 60 further includes an outer or gas path wall 93 radially spaced from an inner or back side wall 94. The back side wall 94 has a predetermined thickness such as 0.050 inches to reduce or minimize transient temperature gradients between the gas path side 66 and the back side 64. Preferably, the inner nozzle band 52 comprises a monocrystal alloy material oriented such that the monocrystal secondary axis (primary is radial) is circumferentially along the inner nozzle band 52. It should be appreciated that the secondary axis of the monocrystal alloy may be orientated to a suitable predetermined direction by conventional and known process.

In operation, cooling discharge air from the compressor 20 flows through a passage to the back side 64 of the inner nozzle band 52 forward of the mounting flange 56. The cooling air, represented by arrows 63, then flows through cooling aperture 62 and is exhausted as a thin film over the platform 54. Cooling air, represented by arrows 96, also flows from the back side 64 forward of the mounting flange 56 through feed apertures 68 and into the inlet passage 78 of the pin fin bank 70. Air then flows through the other passages 80 and 82 to the outlet passage 84. Air is discharged from the outlet passage 84 through the discharge apertures 86, represented by arrows 96, and directed tangentially away to reduce turbine performance losses.

Accordingly, coolant air introduced through the feed apertures 68 provides convective cooling, resulting in high internal heat transfer coefficients. Cooling of the backside 64 of the band overhang 60 greatly enhances the thermal insulating effect of the thermal barrier coating 88. Combined, these result in acceptable temperature levels for the band overhang 60 with minimal cooling requirements.

Additionally, the pin fin bank 70 yields higher life capability with less cooling flow than the solid continuous band overhang. The use of the thermal barrier coating 88 is particularly effective during transient operation to reduce temperature gradients between the gas path side 66 and the back side 64 of the bank overhang 60. The pin fin band 70 provides uniform thru-flow of air and also assures a direct conductivity path between the gas path side 66 and the back side 64 of the overhang 60, providing significantly more conduction than serpentine passages.

Further, cooling air that is discharged out the aft end of the band overhang 60 is not a serious performance penalty since this is the prime area of flow metering and the pressure drop is used to produce a significant velocity in the direction of the gas flow. This also helps to reduce the gas ingestion into the forward rotor cavity. Backflow margin is not effected if axial cracks develop in the band overhang 60 since most of the flow metering is done at the trailing edge discharge apertures 86.

Also, orientation of the monocrystal secondary axis circumferentially along the band overhang 60 greatly reduces thermal stress and increases life of the band overhang 60. Due to the bolt-less retention of the mounting flange 56, the axial length of the band overhang 60 is short as compared with the present lengths, thereby reducing thermal gradients. Further, the thickness of the back side wall 94 of the band overhang 60 was adjusted to a predetermined thickness to reduce transient temperature gradients between the gas path side 66 and the back side 64. Moreover, the radical height of the pin back passages 78, 80, 82 and 84 was adjusted to predetermined heights to reduce steady-state temperature gradients in the axial direction. As a result, the forward or inlet end of the passages is large where the upstream film is high and the aft or outlet end of the passages is reduced to increase the back side cooling where the film effectiveness is decaying.

The present invention has been described in an illustrative manner. It is to be understood that the terminology which has been used is intended to be in the nature of words of description rather than of limitation.

Many modifications and variations of the present invention are possible in light of the above teachings. It is, therefore, to be understood that within the scope of the appended claims, the present invention may be practiced otherwise than as specifically described.

What is claimed is:

1. A nozzle assembly for a gas turbine engine, comprising:

a plurality of circumferentially spaced vanes;

a nozzle band to support said vanes and including a mounting flange extending radially from said nozzle band and adapted to be secured to the gas turbine engine, said nozzle band having a gas path side for partially defining a hot core gas flowpath during engine operation, a back side, and a cast overhang portion axially downstream of said mounting flange;

said overhang portion having a gas path wall and a back side wall;

a pin fin bank means cast within said overhang portion radially spacing said gas path wall and said back side wall for allowing cooling fluid to flow therethrough to cool said overhang portion by convection to the cooling fluid flow and for allowing heat conduction from said gas path side through said gas path wall and said pin fin bank means to said back side wall; and a thermal barrier coating on said gas path wall having a surface on the gas path side continuous with the axially upstream nozzle band gas path side, wherein said thermal barrier coating is disposed above said pin fin bank means.

2. The nozzle assembly of claim 1 wherein said nozzle band includes means forming a plurality of feed apertures to allow cooling air to enter said pin fin bank means.

3. The nozzle assembly of claim 2 wherein said nozzle band includes means forming a plurality of discharge apertures to allow cooling air to exit said pin fin bank means.

4. The nozzle assembly of claim 3 wherein said pin fin bank means comprises a plurality of pins spaced laterally and axially.

5. The nozzle assembly of claim 4 wherein said pins are generally round in cross-section.

6. The nozzle assembly of claim 4 wherein said pin fin bank means forms a plurality of passages extending laterally and spaced axially, one of said passages being disposed between adjacent lateral rows of said pins.

7. The nozzle assembly of claim 1 wherein said thermal barrier coating comprises a first layer of a high oxidation resistant rough material disposed on a recessed portion of said overhang portion and a second layer of ceramic material.

8. The nozzle assembly of claim 1 wherein said nozzle band further comprises:
    means forming a plurality of feed apertures to allow cooling air to enter said pin fin bank means from the back side of said nozzle band;
    means forming a plurality of discharge apertures to allow cooling air to exit said pin fin bank means at an aft end of said overhang portion;
    wherein said pin fin bank includes a first laterally extending row of pins with a radial height greater than an axially spaced and second laterally extending row of pins;
    whereby cooling of said overhang by said pin fin bank means is increased axially.

9. A nozzle assembly for a high pressure turbine of a gas turbine engine, comprising:
    a plurality of circumferentially spaced vanes;
    a nozzle band to support said vanes and including a mounting flange extending radially from said nozzle band and adapted to be secured to the gas turbine engine, said nozzle band having a gas path side for partially defining a hot core gas flowpath during engine operation, a back side, and a cast overhang portion axially downstream of said mounting flange;
    said overhang portion having a gas path wall and a back side wall;
    a pin fin bank means comprising a plurality of laterally and axially spaced pins cast within said overhang portion radially spacing and integral with said gas path wall and said back side wall for allowing cooling fluid to flow therethrough and for conducting heat from said gas path wall to said back side wall; and
    a thermal barrier coating on said gas path wall having a surface on the gas path side continuous with the axially upstream nozzle band gas path side, wherein said thermal barrier coating is disposed above said pin fin bank means.

10. The nozzle assembly of claim 9 wherein said thermal barrier coating has a first layer disposed in a recessed portion of said overhang portion and a second layer adjacent said first layer and having an outer surface continuous with an outer surface of said nozzle band.

11. The nozzle assembly of claim 10 wherein said first layer comprises a high oxidation resistant material.

12. The nozzle assembly of claim 10 wherein said second layer comprises a ceramic material.

13. The nozzle assembly of claim 9 wherein said nozzle band comprises a monocrystal alloy having a secondary axis circumferentially along said nozzle band.

14. The nozzle assembly of claim 9 wherein said back side wall has a predetermined thickness.

15. The nozzle assembly as set forth in claim 9 wherein a first laterally extending row of said pins has a radial height greater than an axially spaced and second laterally extending row of said pins.

16. The nozzle assembly of claim 9 wherein said nozzle band includes means forming a plurality of feed apertures to allow cooling air to enter said pin fin bank means from a back side of said nozzle band.

17. The nozzle assembly of claim 16 wherein said nozzle band includes means forming a plurality of discharge apertures to allow cooling air to exit said pin fin bank means at an aft end of said overhang portion.

18. The nozzle assembly of claim 17 wherein a first laterally extending row of said pins has a radial height greater than an axially spaced and second laterally extending row of said pins whereby cooling of said overhang portion by said fin bank means increases axially.

19. A nozzle assembly for a high pressure turbine of a gas turbine engine comprising:
    plurality of circumferentially spaced vanes;
    a cast nozzle band to support said vanes and having a gas path side and a back side, with a portion extending generally laterally of said vanes upstream of a throat and another portion extending generally laterally of said vanes downstream of the throat;
    a plurality of laterally and axially spaced pins forming a pin fin bank within said downstream portion for conducting heat from said gas path side to said back side;
    means forming a plurality of feed apertures to allow cooling air to enter the pin fin bank;
    means forming a plurality of discharge apertures to allow cooling air to exit the pin fin bank, whereby cooling air enters the pin fin bank through said feed apertures and flows through the pin fin bank and exits the pin fin bank to cool said downstream portion convectively; and
    said gas path side of said downstream portion having a thermal barrier coating disposed above said pin fin bank;
    whereby a temperature gradient in said downstream portion between said gas path side and said back side during engine operation is minimized

* * * * *